(12) United States Patent
Buer

(10) Patent No.: US 8,677,482 B2
(45) Date of Patent: Mar. 18, 2014

(54) HARDWARE SECURITY FOR SOFTWARE PROCESSES

(75) Inventor: Mark L. Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 459 days.

(21) Appl. No.: 12/723,209

(22) Filed: Mar. 12, 2010

(65) Prior Publication Data

US 2010/0235647 A1  Sep. 16, 2010

Related U.S. Application Data

(60) Provisional application No. 61/159,777, filed on Mar. 12, 2009.

(51) Int. Cl.
  *G06F 21/00*  (2013.01)
(52) U.S. Cl.
  USPC .............................. 726/22; 713/187; 713/170
(58) Field of Classification Search
  USPC .............................. 713/187–194, 170; 726/22
  See application file for complete search history.

(56) References Cited

U.S. PATENT DOCUMENTS

| 5,974,549 | A  | * | 10/1999 | Golan | 726/23 |
| 7,457,951 | B1 | * | 11/2008 | Proudler et al. | 713/164 |
| 2007/0250927 | A1 | * | 10/2007 | Naik et al. | 726/22 |
| 2008/0022093 | A1 | * | 1/2008 | Kurien et al. | 713/164 |
| 2009/0293118 | A1 | * | 11/2009 | Yan et al. | 726/19 |

OTHER PUBLICATIONS

Linn, Cullen. "Obfuscation of executable code to improve resistance to static disassembly". Journal Title: Proceedings of the ACM Conference on Computer and Communications. Security, Volume and Issue No. 1; pp. 290; Publication Date: 2003; ISSN/ISBN: 15437221 1543-7221.*

Fiskiran, A.; M.; Lee, R.; B. "Runtime Execution Monitoring (REM) to Detect and Prevent Malicious Code Execution." In Proceedings. IEEE International Conference on Computer Design: VLSI in Computers and Processors, 452-7xviii+578;xviii+578. Los Alamitos, CA, USA:IEEE Comput. Soc, 2004.*

Alves, Tiago, et al. "TrustZone: Integrated Hardware and Software Security." Information Quarterly 2004, vol. 3, No. 4, p. 18-24.*

* cited by examiner

*Primary Examiner* — Carl Colin
*Assistant Examiner* — Don Zhao
(74) *Attorney, Agent, or Firm* — Sterne, Kessler, Goldstein & Fox PLLC

(57) ABSTRACT

A system and method for secure processing is provided, wherein a monitor application is injected into a secure application binary within the security perimeter of a secure processor. The components of the monitor application are injected into different portions of the application binary utilizing a seed value. In this manner, the positioning of the monitor application in the application binary is altered each time the application binary is booted. After the monitor application is inserted into the application binary, the secure process is passed to the host processor for execution. During execution of the secure process, a system and method is provided for the monitor application to communicate, to the secure processor, attempts to tamper with or attack the secure process.

26 Claims, 6 Drawing Sheets

HARDWARE SECURITY FOR SOFTWARE PROCESSES

CROSS REFERENCE TO RELATED APPLICATIONS

This application claims the benefit of U.S. Provisional Application No. 61/159,777, filed Mar. 12, 2009, entitled "Hardware Security for Software Processes," which is incorporated herein by reference in its entirety.

FIELD OF THE INVENTION

The present invention generally relates to secure processing and specifically to hardware based security for software processes.

BACKGROUND

Certain types of devices are targets for sophisticated attacks. For example, personal computer systems may become infected with malware, such as key loggers, trojans, and viruses. Valuable information, such as login information, passwords, account numbers, keys, authentication information, or fingerprint templates may be stolen or become compromised or corrupted. Users of personal computers are also subject to phishing attacks, and third parties may impersonate users once confidential user information has been obtained.

A typical personal computer (PC) includes a host, memory, and user input. The majority of PCs today run Windows on an Intel processor. These systems may be referred to as Wintel systems. Wintel systems have security weaknesses that are popular targets for hackers. Therefore, vendors and users are continually trying to develop techniques to make these systems more secure. Many systems, including Wintel systems, provide encrypted storage where the user and system can store data. When the system is at rest (i.e., when data is not being used), the data is protected in the encrypted storage. However, the data may be retrieved from the encrypted storage and used by an application running on the host. As soon as the data is removed from the secure storage, the data becomes vulnerable. Sensitive data may be attacked at this sensitive location. Furthermore, the underlying application itself may be attacked.

Conventional anti-virus techniques find only viruses, and, using conventional anti-virus techniques, viruses are found only after a problem is detected. Thus, computer hackers and other malware creators design malicious code to circumvent the security measures in the anti-virus software, and the software has to be updated or redesigned to counter the new malware attacks. Some conventional protection programs offer several layers of protection, where each layer of protection may secure another layer. However, the software securing other software can itself be attacked and used to introduce malware into the underlying application. As techniques become more sophisticated to protect against known malware attacks, more sophisticated malware is designed to circumvent them.

Another conventional approach utilizes hardware-level security. Often, Trusted Platform Modules (TPMs) are used to provide security to software. However, TPMs require extensive management, which is difficult or impossible for consumers, and they are typically directed towards making an entire platform more robust. Further, secured information is still vulnerable once a software application has obtained the secured information from the TPM.

Accordingly, what is needed are methods, systems, apparatuses, and computer program products to more effectively secure a computer application.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

Figure 1:
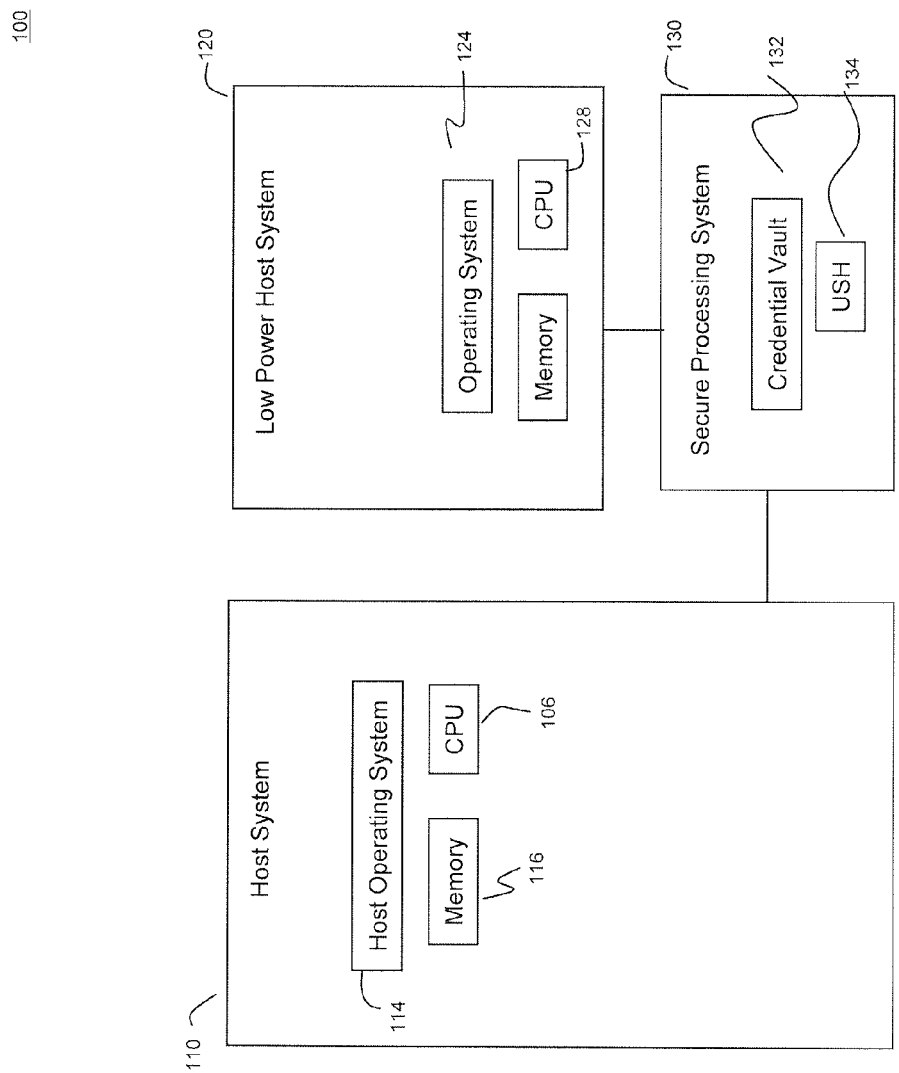
FIG. 1 depicts a computer system having a secure processing system, according to embodiments of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

1. Architectural Overview

FIG. 1 depicts an exemplary computer system 100. Exemplary computer system 100 includes a host system 110 having a processor (e.g., CPU) 106. Host system 110 also includes a memory 116 for storing applications or other processes for execution in CPU 106. Host system 110 and associated resources are traditionally open with little or no security for executing processes or applications.

Host system 110 may be based on an Intel x86 CPU running a Windows operating system 106. Windows—Intel systems are commonly referred to as Wintel systems. Processes and applications on the host system are exposed to attacks including Wintel-based attacks.

System 100 may optionally include one or more additional processing systems such as low power host processing system 120. Low power host system 120 may be based on an ARM processor 128 running a separate operating system (e.g., Linux) 124. Low power host system 120 is designed to handle low power processing applications (e.g., e-mail, web browsing). This enables system 100 to extend the battery life of the system by running certain applications on the low power host processor instead of the higher power Windows host processor. Like host system 110, low power system 120 also traditionally has little or no security for executing processes or applications.

To address these issues, embodiments of the present invention provide hardware-based security to these software processes via secure processing system 130. Secure processing system 130 includes a credential vault 132 and a secure processor 134. Secure processing system 130 may be a Unified Security Hub (USH). In embodiments of the invention, secure processing system 130 is integrated with host system 110 and optional processing system 120. In alternate embodiments, secure processing system 130 is provided on a secure token such as a USB device or similar device or via an external device coupled to host system 110.

Embodiments of the present invention allow for a multi-tiered approach to securing processes executing on processing systems having limited or no security functionality. In a first tier, processes requiring a high level of security can be stored and executed on the secure processor within the secure processing system 130. However, it may not be practical to store and execute all processes from the secure processing system, particularly those that don't require the same level of security as highly sensitive processes. Therefore, systems and methods of the present invention provide the ability to ensure the integrity of processes executing outside the secure boundary of the secure processing system.

In an embodiment, integrity is provided by integrating secure monitoring code with an application binary prior to launch of the application. In this embodiment, operation of the application is not impacted. The monitoring code executes in concert with execution of the application.

In an additional or alternative embodiment, integrity is provided by monitoring the processor via a monitoring module of the secure processing system. Secure processing system may monitor the integrity of known processes executing on the process. A secure processing system analyzes these known (or "good") processes looking for any malicious modification or interference with their proper functioning. The secure processing system may also scan, either continually or periodically, memory associated with the processor to identify unknown and potentially malicious processes.

Figure 2:
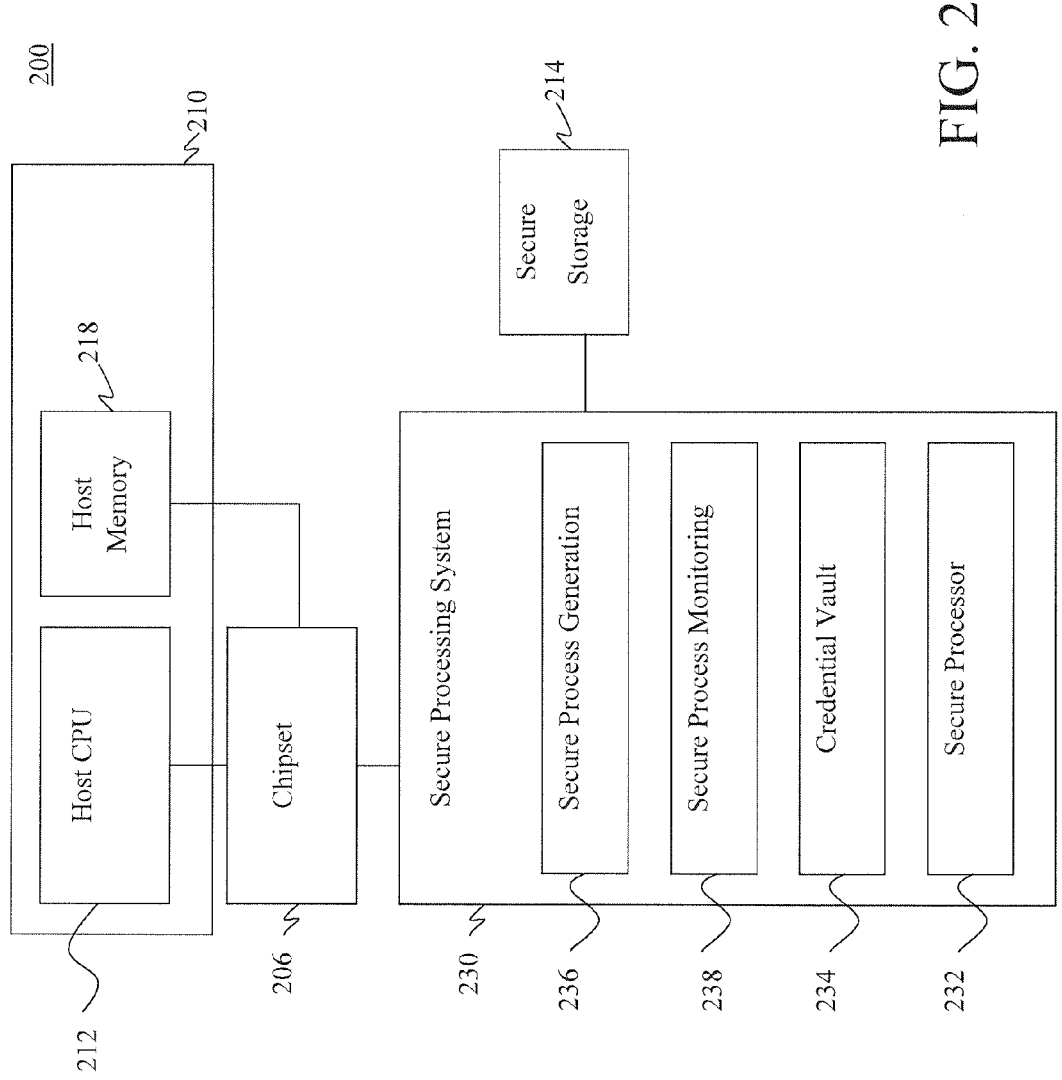
FIG. 2 is a diagram of an exemplary system for hardware-based security for software processes, according to an embodiment of the present invention.

FIG. 2 is a diagram of an exemplary system 200 for hardware-based security for software processes, according to an embodiment of the present invention. FIG. 2 includes at least two separate physical systems—host processing system 210 (e.g., normal Windows processing) and security processing system 230. Host processing system 210 further includes secure storage 214 and an optional separate chipset 206.

Host processing system 210 includes a processor 212 and a memory 218. Host processing system 210 may additionally comprise suitable logic, circuitry, and/or code that may enable control and/or management of the data processing and/or networking operations associated with host system. The host memory 218 may comprise suitable logic, circuitry, and/or code that may enable storage of data utilized by host system.

Secure processing system 230 includes a secure processor 232, a credential vault 234, secure process generation unit 236, and a secure process monitoring unit 238. Credential vault 234 is configured to store authentication data for applications and/or processes as well as cryptographic keys.

Security processing system 230 may be implemented using, for example, a Unified Security Hub (USH). Host system 210 and security processing system 230 are configured to communicate, for example, using chipset 206. Host system 210 may access host memory 218 (for example, RAM).

Secure process generation unit 236 is configured to integrate a secure monitor application with an application binary when an application is launched. The method used for integrating secure monitor code with an application binary is described in detail below.

Secure process monitoring unit 238 is configured to receive and analyze data regarding events monitored by secure monitoring code and to detect attacks or other anomalous situations associated with a process executing on a processor. Secure process monitoring unit 238 may be further configured to remediate identified attacks or anomalous situations.

Chipset 206 is optional. When present, chipset 206 may supply additional functionality to the system such as cryptographic operations FIG. 2 depicts secure processing system 230 as a separate physical processor (e.g., a physical chip). In alternate embodiments, secure processing system 230 may be entirely software based or partially software based. For example, in embodiments of the invention, secure processing system 230 may run as a process on the host machine or run as a virtual machine.

Secure storage 214 is coupled to secure processing system 204. Secure storage 214 is configured to store data used or accessed by secure processing system 204. Secure storage 214 is secured via cryptographic techniques and/or physical security techniques. In an embodiment, secure storage 214 stores application binaries.

In an embodiment, secure storage 214 is located on the same chip as secure processing system 204. In another embodiment, secure storage 214 is located off-chip and is accessible by secure processing system 204.

2. Methods

As discussed above, software applications may be attacked using a variety of techniques. For example, an attacker may inject malicious code into an application when the application is at rest (not executing). An attacker may also attempt to inject malicious code into an application while the application is executing. Applications executing on insecure processors or low security processors are particularly vulnerable to this form of attack. The following methods are directed to securely monitoring and detecting attacks or other forms of interference with an application.

2.1 Integrated Monitoring Code

Figure 3:
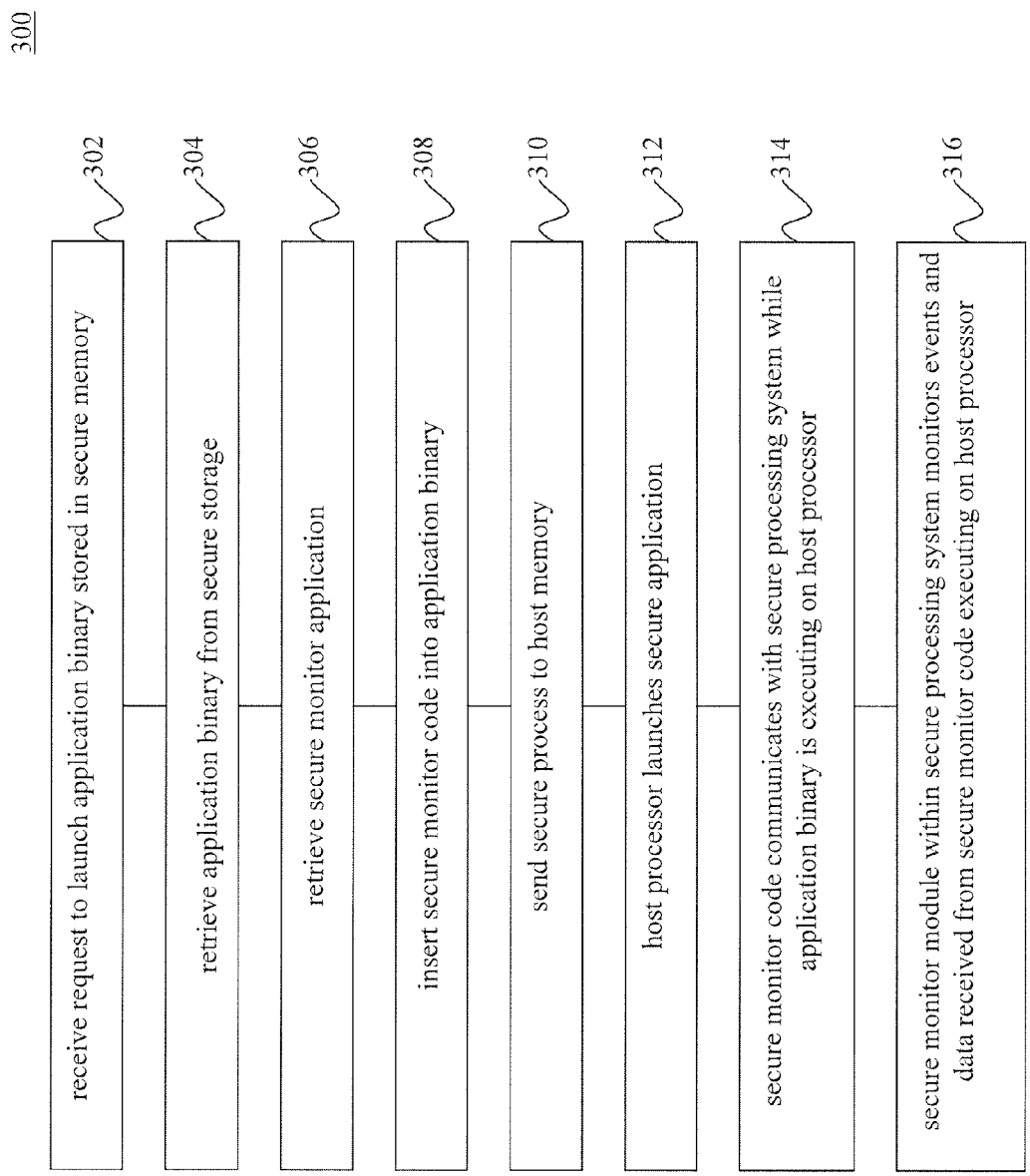
FIG. 3 is a flowchart of a method for generating a secure application to be executed on an insecure or low security processor, according to embodiments of the present invention.
Figure 4:
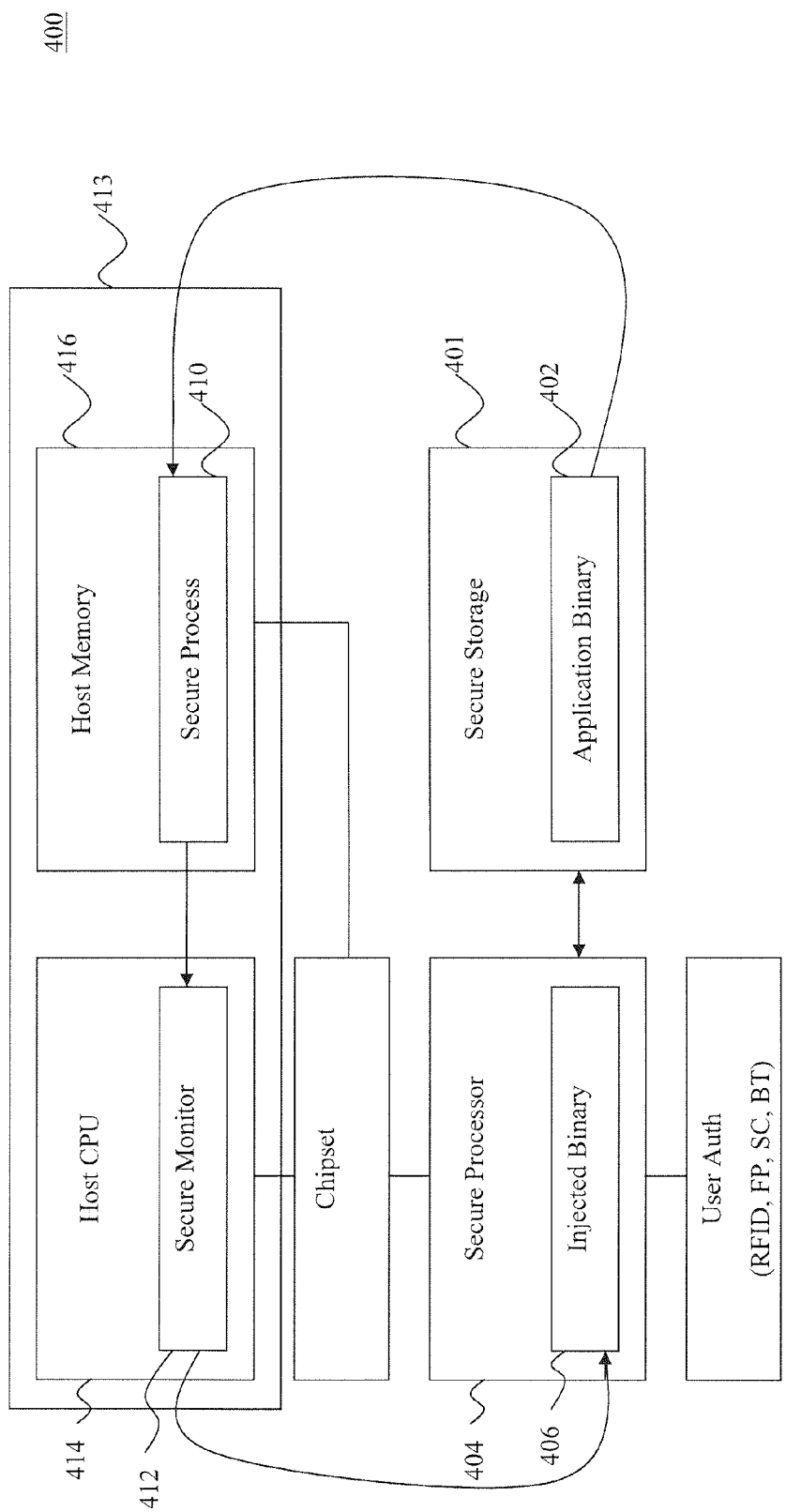
FIG. 4 is a block diagram of an exemplary system for providing hardware-based security for software processes, according to embodiments of the present invention.

FIG. 3 is a flowchart 300 of a method 300 for integrating monitoring into an application to be executed on an insecure or low security processor, according to embodiments of the present invention. FIG. 3 is described with reference to the system of FIG. 4. However, the method of FIG. 3 is not limited to that embodiment.

Prior to step 302, an application binary 402 is received and stored in secure storage 401. Prior to storing application binary 402 in secure storage 401, secure processor system 404 may authenticate application binary 402. This step is performed to determine whether malicious code was injected into the application binary prior to receipt by the secure processor system 404. Because application binary 402 is being stored with secure storage 401, the threat of malicious code injection into application binary 402 after storage is significantly minimized and likely removed. Authentication may be performed, for example, using cryptographic hashing or cyclical redundancy checks or checksums. The authentication data for the application may be stored in credential vault 234 or secure storage 214.

In step 302, secure processor system 404 receives a request to launch (or load) an application binary stored in secure memory 401. For example, secure processor system 404 receives a request to launch application binary 402. Any type of application or process may be used in the present invention. For example, the application binary may be an operating system, anti-virus software, a data loss and prevention application, word processing application, browser software, or the like. The system and method according to an embodiment also have the potential to protect kernel level processes without kernel interaction and without knowledge of the application binary.

In step 304, the requested application binary (e.g., application binary 402) is retrieved from secure storage 401. Application binary 402 may be encrypted and stored in its encrypted form in secure storage 214. If the application binary is encrypted, it may first be decrypted. If encrypted, an encryption key or keys necessary to decrypt the binary for execution is received and stored either within secure storage 401 or within a credential vault in secure processor system 404. The decryption operation may be offloaded to another processor within the system (e.g., chipset 206) or performed by the secure processing system.

In step 306, secure monitor code such as secure monitor code 412 is retrieved by secure processor system 404. It will be understood by one of ordinary skill in the art that the secure monitor code may be received by the secure processor before, after, or while the application binary is being disassembled in step 308.

In step 308, the secure processor system 404 disassembles the retrieved application binary and inserts the secure monitor code. In an embodiment, the disassembly and insertion is performed by a secure process generation module within secure processor system 404. The disassembly allows for the secure monitor code to be interwoven with the application binary. To increase the security of the process, the secure processor system 404 uses techniques in embodiments to ensure that the application binary is disassembled and secure monitor code inserted in a different manner each time the application binary is requested from the secure processor system 404. These techniques make it difficult for an attacker to know the location of the monitor code the next time the application is launched if the attacker is able to obtain and reverse engineer a prior version of the application binary having the monitor code. Further, note that the disassembly and insertion techniques will vary from system to system which introduces further uniqueness to generated secure process. Additionally, in an embodiment, disassembly of the application binary by the secure processor system 404 is optional. For example, in an embodiment, the application binary is stored in a disassembled state and is thus already disassembled before reaching the secure processor system 404. The disassembled code may be stored in encrypted form.

In an embodiment, the positioning of the monitor application in the application binary is determined through the use of a seed value. The seed value may be generated, for example, by a random number generator or a pseudo random number generator within the secure processor. For example, the random number generator may be implemented in an integrated circuit, and in an embodiment, may generate random numbers based on noise signals. This approach provides additional security measures because, for example, a hostile application attempting to target the monitor application will not know the position of the monitor application in the application binary in advance based on a location of the monitor application in the application binary determined during a prior attack. The monitor code is injected into portions of the application binary without adversely impacting the execution of the application binary. The monitor application may be, for example, anti-virus software or specialized monitoring code and may include multiple levels of protection.

Alternatively, in step 308, the secure processor system 404 operates on a small portion of the binary or a small portion of the disassembled code. In this embodiment, the secure processor system 404 may inject an encryption key.

In step 310, the secure processor system 404 communicates the secure application process (e.g., secure application process 410) to host memory 416.

In step 312, the host processor may then launch the secure application including the secure monitor code. Execution of the application is not impacted by the introduction of the secure monitor code. Instead, the secure monitor code executes in concert with the application. Note that this step is optional.

In step 314, the secure monitor code (e.g., secure monitor code 412) communicates with secure processor system 404 during the period when the application is executing on host CPU 414 on host processing system 413. The secure monitor code identifies events occurring during execution of the application and sends the events and other data to the secure processor system 404 for analysis. For example, the monitor code may communicate attempts to tamper with, attack, or otherwise interfere with the operation of the secure process. The secure monitor code may also have procedures to remediate or take certain actions if specific events or conditions are detected. For example, secure monitor code may stop executing if it is determined that an attack is taking place or has occurred. Additionally, the secure monitor may not launch a requested application or process if it has been determined that an attack is likely to take place.

In step 316, a secure process monitoring unit 238 within secure processor system 404 receives and monitors the events and data received from the secure monitor code executing on the host CPU 414. The secure process monitoring unit can then take appropriate action when certain conditions or events are detected. For example, if the secure process monitoring unit 238 determines that the application is being attacked or has been attacked, the secure process monitoring unit 238 can cause the application to stop executing or can cause the application to be isolated from other applications. Secure process monitoring unit 238 may also encrypt or decrypt sensitive portions of the application code or data needed by the application or data such as intermediate data generated by the application code. The secure process monitoring unit 238 may further ensure that the application process is executing the host processor 414. For example, the secure monitor may not launch a process if several previous attacks on the process have occurred.

Although discussed separately, a person of skill in the art will recognize that steps 314 and 316 may be repeated and/or performed simultaneously in some situations or in a different order.

As illustrated by the above discussion, the secure application or process generated by the method of FIG. 3 is unique per boot (or launch) of the application as well as unique for the system. This uniqueness provides an added layer of security. That is, the monitor code will not be inserted into the application binary in the same manner on a different system. Similarly, even on the same system, the monitor code will not be injected in the same manner the next time the same application is launched.

2.2 Monitoring Another Processor

As discussed above, secure processor system 404 may be a component of or external to a system having one or more additional processors. These processors may lack security or have a lower level of security then is desired by a user. In these systems, secure processor system 404 may provide the capabilities to monitor one or more of the additional processors.

A secure processing system may use a variety of techniques to monitor another processor. In one technique, a secure processing system may monitor the integrity of known processes executing on the processor. Secure processing system analyzes these known (or "good") processes looking for any modification or interference with their proper functioning. That is, the secure processing system is looking for the corruption of "good processes." In a second technique, secure processing system scans, either continually or periodically, memory associated with the processor to identify unknown and potentially malicious processes. For example, some processes may exhibit behavior characteristic of a malware process, and some processes may exhibit behavior characteristic of a process that has been infected by malware.

Additionally, the monitor application may detect when the secure process requires secure (e.g., cryptographic key) material. When detected, the monitor application may invoke the secure processor to perform the requested function so that highly secure information is never exposed on the unsecure host. Further, the process outlined above may operate under the control of an authenticated user.

Figure 5:
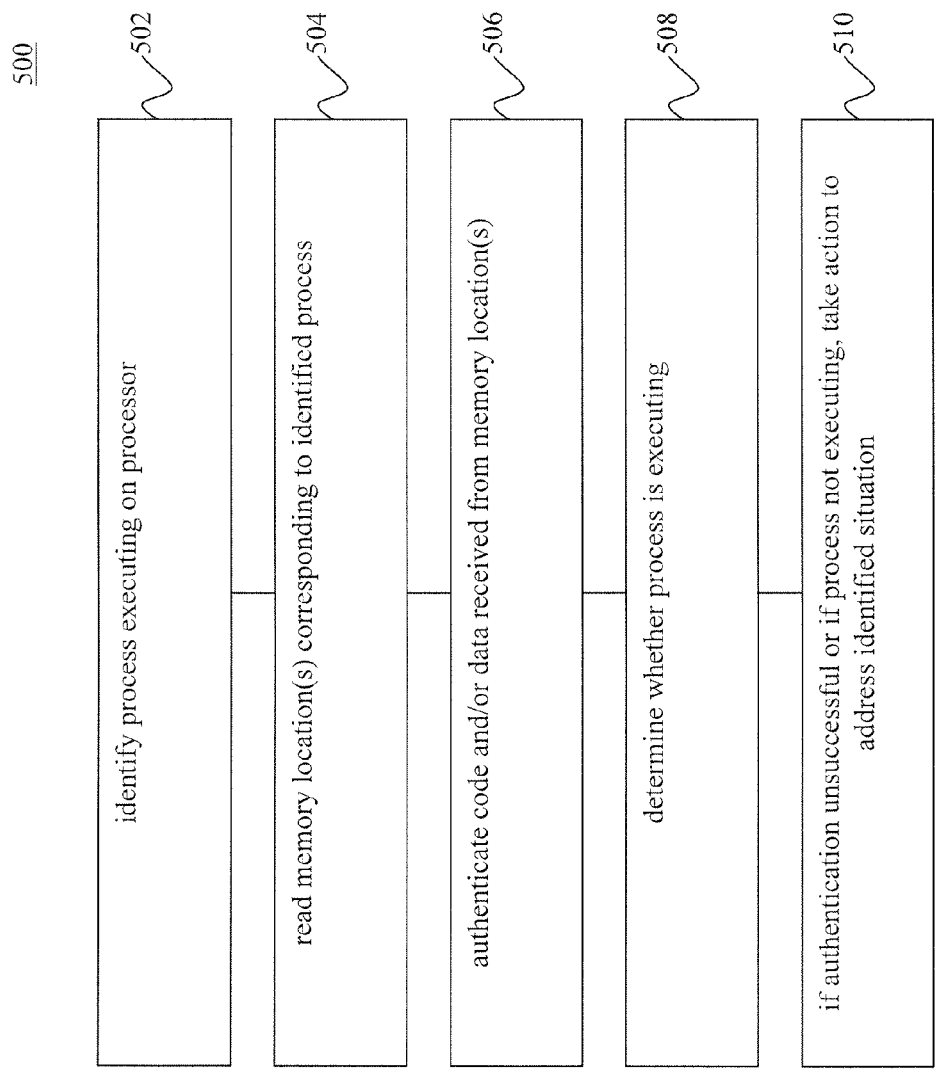
FIG. 5 is a flowchart of a method for monitoring a process executing on a processor separate from the secure processor system, according to embodiments of the present invention.

FIG. 5 is a flowchart 500 of a method for monitoring a process executing on a processor separate from the secure processing system, according to embodiments of the present invention. Flowchart 500 is described with continual reference to the system of FIG. 4. However, flowchart 500 is not limited to that embodiment.

In step 502, one or more processes executing (or capable of executing) on a processor such as a host CPU are identified. For example, a process may register its location (or locations) in memory with the secure processing system when the processor starts. In addition, or alternatively, the secure processing system may monitor and/or scan memory to identify where a process resides in memory.

In step 504, secure processor system 404 reads the memory location or locations of interest. In an embodiment, step 504 is initiated each time the memory location or locations of interest are changed or each time a page interrupt associated with the memory location of interest occurs.

In step 506, secure processor system 404 authenticates the code and/or data retrieved from the memory location or locations of interest. In an embodiment, secure processor system 404 stores authentication parameters for one or more process of interest in the credential value within secure processor system 404 or within secure storage 401. Secure processor system 404 authenticates the code and/or data using the stored authentication parameters.

The level of authentication performed may be determined based on a policy for the system or for the specific process. For example, certain applications may not require a high degree of security so a weaker authentication process may be appropriate for these processes. Alternatively, the system may perform the same type of authentication for each process. Example authentication techniques which could be used include cryptographic hashing, cyclical redundancy checks, or digital watermarking techniques.

Failure of authentication may indicate that the application has been modified. For example, failed authentication could indicate the injection of malicious code during execution or while the code was at rest in the non-secure memory location.

In step 508, a determination is made whether the process is executing. Step 508 is optional. It may be performed for every process being monitored, a subset of processes being monitored, or not performed. A variety of techniques could be utilized to determine whether a process is executing. For example, the secure processor system 404 may look at the frequency of changes occurring in the processor and/or memory. Alternatively, for certain applications, the application may include periodic handshakes or cryptographic handshakes with a secure monitor to indicate to the secure monitor that the application is still executing. In further alternative, the compiler of an application or process may build in checkpoints to the code which provide handshakes or cryptographic handshakes between the application and the secure monitor to indicate the application is still executing.

Step 508 is important for certain applications that run continuously in the background such as anti-virus or data loss and prevention applications. For these types of processes, it is vital to know that they are still operating and that an intruder did not stop the execution of these processes in order to insert other types of malicious code into the system.

In step 510, if authentication is unsuccessful or the interference with operation of a process is identified in step 508, secure processor system 404 may take action to address the identified situation.

For example, if authentication is unsuccessful, secure processor system 402 may take steps to isolate the corrupted process from other processes executing on the system. In embodiments, secure processing system may shut down the corrupted process or even the entire system if certain criteria are identified in the monitoring process. Additionally or alternatively, secure processing system may communicate to an external system an indication that a potential security breach or event has occurred.

3. Examples 3.1 E-Commerce

Electronic commerce applications, particularly those that require a user to enter sensitive data such as credit card numbers, bank account information, or account passwords or security data are primary targets for attackers. A common technique used by hackers to capture this data involves the injection of code into the underlying application to copy and transmit the data of interest to the hacker without the user noticing any disruption to the operation of the application.

Many e-commerce applications are accessed via a browser executing on a user's computer. Therefore, browser software is often targeted. The integrity of browser software may be ensured using the techniques described above. For example, a secure processing system may integrate secure monitor code into the application binary for a browser. Additionally, or alternatively, the browser application could be monitored by the secure processing system.

In addition, any applets such as Java applets utilized by e-commerce applications may be handled in a similar manner.

3.2 Hypervisor

As discussed above, secure processor system may be software based or partially software based. The methods and systems of the present invention may be utilized to ensure the integrity of the components of this software based architecture.

Figure 6:
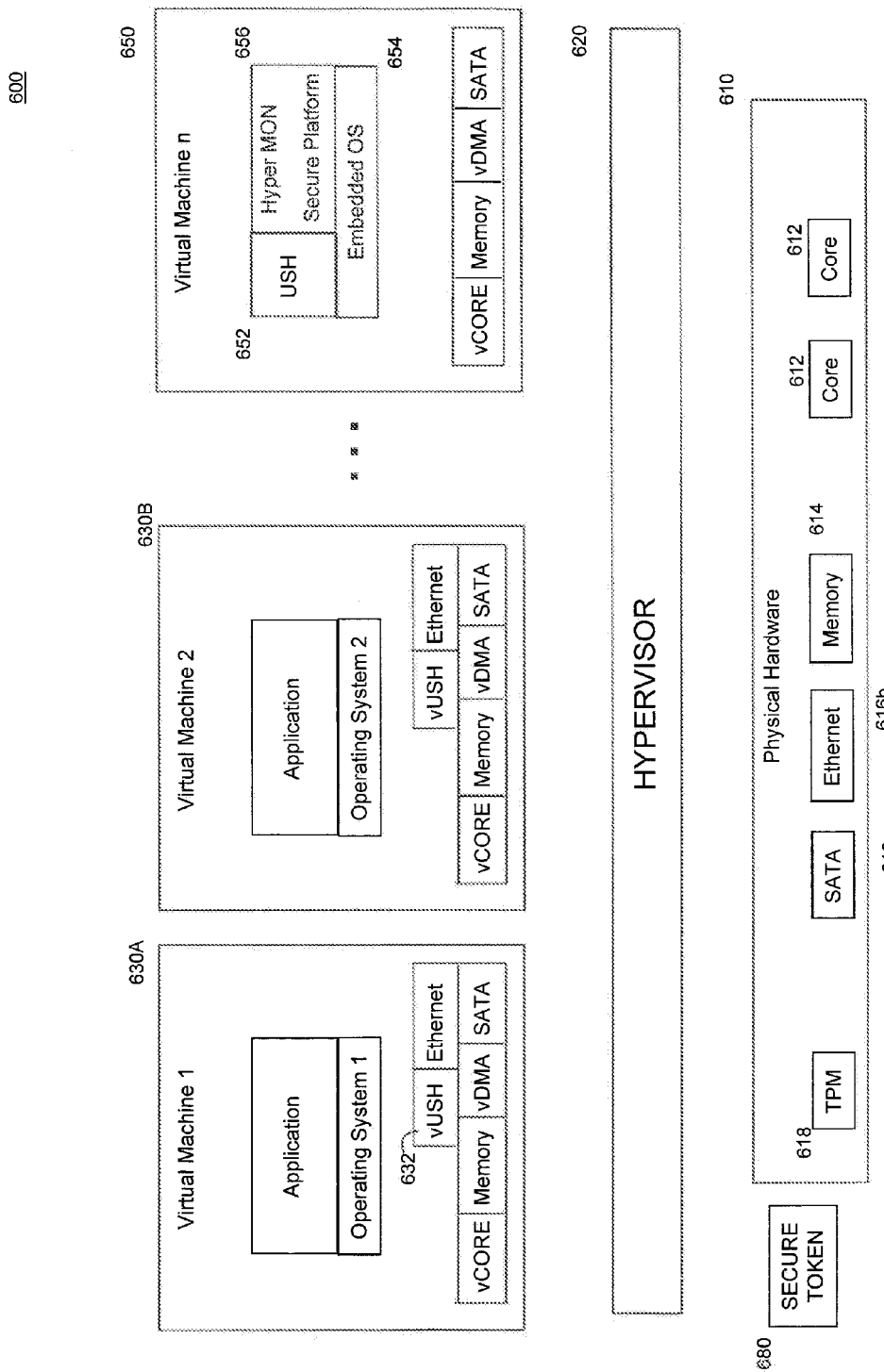
FIG. 6 depicts a block diagram of a system having a software based security processing system, according to embodiments of the present invention.

FIG. 2 depicts the security processing system 200 as a separate physical processor (e.g., a physical chip). In alternate embodiments, the security processing system may be entirely software based or partially software based. For example, in embodiments of the invention, the security processing system may run as a process on the host machine or run as a virtual machine. FIG. 6 depicts a block diagram of a system having a software based security processing system, according to embodiments of the present invention.

A Hypervisor is a layer of software that manages multiple instances of Virtual Machines (VM). Each virtual machine may contain independent OS and applications. The underlying hardware is shared between these machines. The Hypervisor enforces the assignment of resources and separation between the virtual machines. Typically the Hypervisor starts as a separate VM that is used to service and monitor both the Hypervisor and other VMs. Since this results in software monitoring software, security of the VM manager is critical.

At a high level, a virtual machine is a representation of a machine in software. A virtual machine provides hardware independence for an operating system and/or an application. Additionally, through the use of multiple virtual machines, applications (and/or operating systems) can be made independent and isolated from each other.

The host system may support the operation of a virtual machine via a Hypervisor. The number of virtual machines or guest operating systems supported by the host system need not be limited. For example, two or more virtual machines and/or guest operating systems may be supported by the host system.

The Hypervisor may operate as a software layer enabling operating system virtualization of hardware resources in the host system. Alternatively, a Hypervisor may operate as a software layer that enables virtualization of hardware resources coupled to the host system. The Hypervisor may further enable data communication between virtual machines and the hardware resources of the host system.

The exemplary system 600 of FIG. 6 includes a first virtual machine 630A, a second virtual machine 630B, an nth virtual machine 650, a Hypervisor 620 (also referred to as a virtual machine manager), and a host system 610. Host system 610 includes one or more host processors 612, a host memory 614, and one or more additional hardware resources such as a serial AT attachment (SATA) 616a and Ethernet device 616b. Host system further includes a trusted platform module (TPM) 618.

Trusted Platform Module (TPM) 618 is a secure cryptographic processor. For example, a TPM may be designed to meet the specifications defined by the Trusted Computing Group (TCG). TPM 618 may support authentication algorithms, encryption/decryption algorithms, random number generation, and secure key and data storage. For example, TPM 618 may be utilized to store cryptographic keys when the keys are at rest in the system.

At a high level, a virtual machine such as virtual machines 630A, 630B, and 650 are representations of a machine in software. A virtual machine provides hardware independence for an operating system and/or an application. Additionally, through the use of multiple virtual machines, applications (and/or operating systems) can be made independent and isolated from each other. In FIG. 6, virtual machines 630A and 630B include an operating system 632A, 632B and one or more application 634A, 634B. In embodiments, operating system 632A and/or operating system 632B are guest operating systems. A guest operating system is an operating system that would have run on a physical system separate from the hardware processor of system 600. Operating system 632A and operating system 632B may be the same operating system (e.g., Linux) or different operating systems (e.g., windows and Linux). Virtual machines 630A and 630B may also include virtualization of other hardware resources as depicted in FIG. 6.

Host system 610 may comprise suitable logic, circuitry, and/or code that may enable data processing and/or networking operations, for example. The host system 610 may support the operation of a first virtual machine (and first guest operating system), a second virtual machine (and second guest operating system), and an nth virtual machine via a Hypervisor 620. The number of virtual machines or guest operating systems supported by the host system 620 need not be limited by the exemplary embodiment of FIG. 6. For example, two or more virtual machines and/or guest operating systems may be supported by host system 610.

Hypervisor 620 may operate as a software layer enabling operating system virtualization of hardware resources in the host system 610. Alternatively, a Hypervisor 620 may operate as a software layer that enables virtualization of hardware resources coupled to the host system. The Hypervisor may further enable data communication between virtual machines 630A, 630B, and 650 and the hardware resources of host system 310.

The Hypervisor 620 is therefore a critical component of the software based security processing system. In an embodiment of the present invention, secure monitor code is integrated with the application binary for Hypervisor 620 to insure the integrity of Hypervisor 620. After the secure application binary for the Hypervisor is passed to the host system 610 for execution, the Hypervisor may be monitored to detect an attack (or attempted attack) by malicious software, for example, by Hypervisor Monitor 656. In an embodiment, Hypervisor Monitor 656 receives data from the integrated secure monitor code. Hypervisor monitor 656 may be configured to analyze the received data to determine whether the Hypervisor has been compromised or interfered with in any manner.

4. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of ensuring the integrity of an application comprising:
   receiving, at a secure processing system, a request to launch an application binary associated with the application;
   receiving, at the secure processing system and from a secure storage, the application binary;
   receiving secure monitor code;
   in response to receiving the request, integrating the secure monitor code into the application binary to generate a secure application process, wherein the secure monitor code is integrated at a different position in the application binary each time the request to launch the application binary is received;
   communicating the secure application process to a host memory; and
   executing the secure application process on a host processor.

2. The method of claim 1, further comprising:
prior to integrating the secure monitor code, disassembling the application binary.

3. The method of claim 1, wherein receiving the application binary includes receiving a disassembled application binary.

4. The method of claim 1, wherein if the received application binary is encrypted, the method further comprises:
decrypting the application binary prior to disassembly of the application binary.

5. The method of claim 1, wherein the integrating the secure monitor code into the application binary does not adversely impact the execution of the application binary.

6. The method of claim 1, further comprising:
disassembling the application binary using a pseudo-random disassembly technique whereby the disassembly is altered for each subsequent launch of the application binary.

7. The method of claim 1, further comprising:
disassembling the application binary using a random disassembly technique whereby the disassembly is altered for each subsequent launch of the application binary.

8. The method of claim 7, further comprising:
identifying an anomalous condition; and
initiating remedial procedures to address the anomalous condition.

9. The method of claim 1, wherein integrating the secure monitor code comprises:
integrating the secure monitor code using a pseudo-random technique.

10. The method of claim 1, further comprising:
communicating to the secure processing system, using the secure monitor code integrated into the application binary, events occurring during execution of the secure application process.

11. The method of claim 1, further comprising:
authenticating the application binary before it is stored in the secure storage using authentication data for the application binary stored in a credential vault.

12. The method of claim 1, wherein the secure monitor code is integrated into the application binary using a seed value, and wherein the seed value determines the position of the secure monitor code in the application binary.

13. A system comprising:
a secure storage configured to store an application binary;
a secure processing system configured to:
receive a request to launch the application binary, and
in response to receiving the request, integrate the application binary with secure monitor code associated with a secure monitor application to generate a secure application binary, wherein the secure processing system integrates the secure monitor code at a different position in the application binary each time the secure processing system receives the request to launch the application binary;
a host processor configured to:
execute the secure application binary, and
send data from the secure monitor application, wherein the data includes events monitored by the secure monitor application; and
a host memory configured to store the secure application binary.

14. The system of claim 13, wherein the application binary is enterprise software.

15. The system of claim 13, wherein the application binary is a Hypervisor.

16. The system of claim 13, wherein the application binary is an operating system.

17. The system of claim 13, wherein the application binary is a browser.

18. The system of claim 13, wherein the secure processing system further comprises:
a credential vault;
a secure process generation unit; and
a secure process monitoring unit,
wherein the credential vault, the secure process generation unit, and the secure process monitoring unit are coupled to the secure processor.

19. The system of claim 18, wherein the secure process monitoring unit is configured to receive and analyze the data from the secure monitor application.

20. The system of claim 19, wherein the secure process monitoring unit is configured to remediate an identified situation based on analysis of the received data.

21. The system of claim 13, wherein the secure processing system is implemented using a Unified Security Hub (USH).

22. The system of claim 13, wherein the secure processing system is configured to integrate the application binary with the secure monitor code using a seed value, and wherein the seed value determines the position of the secure monitor code in the application binary.

23. The system of claim 13, wherein the secure processing system is configured to inject an encryption key into the application binary.

24. The system of claim 13, wherein the application binary is application binary for a web browser.

25. The system of claim 13, wherein the secure processing system is further configured to:
receive the application binary; and
authenticate the application binary before it is stored in the secure storage using authentication data for the application binary stored in a credential vault.

26. A system comprising:
a secure storage configured to store an application binary;
a credential vault configured to store authentication data for the application binary;
a secure processing system configured to:
receive the application binary;
authenticate the application binary using the authentication data;
store the authenticated application binary in the secure storage;
receive a request to launch the application binary;
retrieve the application binary from the secure storage;
in response to receiving the request, integrate the application binary with secure monitor code associated with a secure monitor application to generate a secure application binary, wherein the secure processing system integrates the secure monitor code at a different position in the application binary each time the secure processing system receives the request to launch the application binary;
a host processor configured to:
execute the secure application binary, and
send data from the secure monitor application, wherein the data includes events monitored by the secure monitor application; and
a host memory configured to store the secure application binary.

* * * * *